Sept. 18, 1962 L. BONO 3,054,368
DRIVE CONNECTION BETWEEN A DRIVE SHAFT AND AN INTERCHANGEABLE
DRIVEN MEMBER, ESPECIALLY FOR THE DRIVE SHAFT
AND DRIVEN MEMBER OF A SEWING MACHINE
Filed March 7, 1960 2 Sheets-Sheet 1

INVENTOR
LUIGI BONO

BY Stevens, Davis, Miller + Mosher
ATTORNEYS

Sept. 18, 1962 L. BONO 3,054,368
DRIVE CONNECTION BETWEEN A DRIVE SHAFT AND AN INTERCHANGEABLE
DRIVEN MEMBER, ESPECIALLY FOR THE DRIVE SHAFT
AND DRIVEN MEMBER OF A SEWING MACHINE
Filed March 7, 1960 2 Sheets-Sheet 2
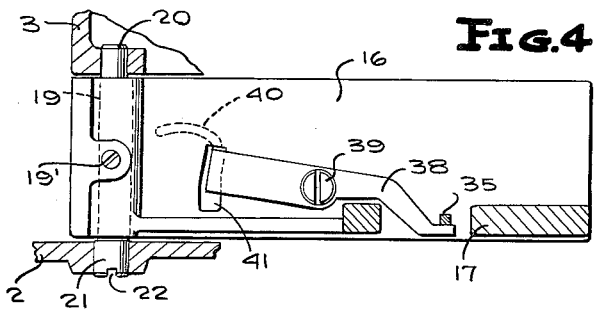
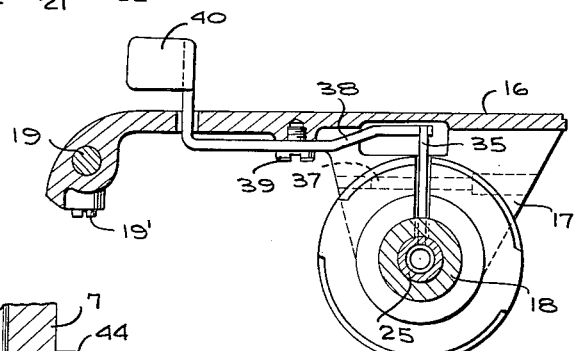
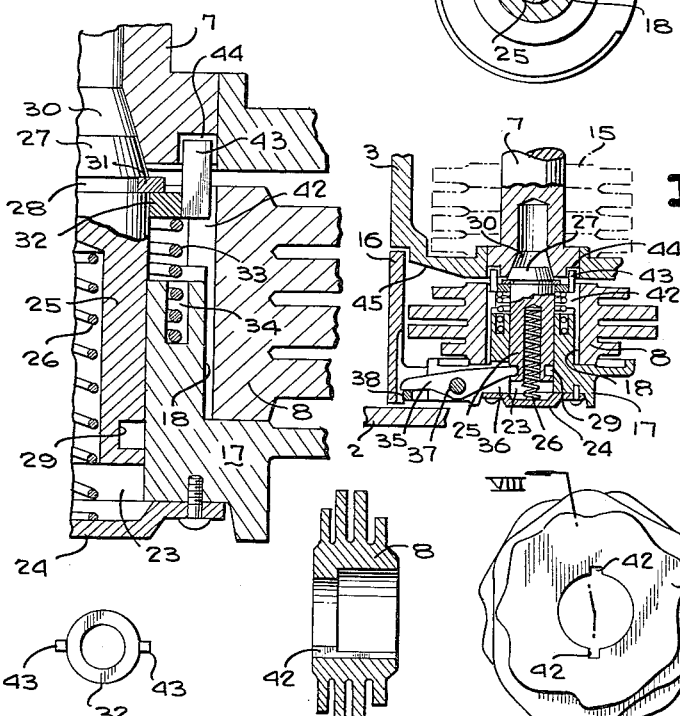
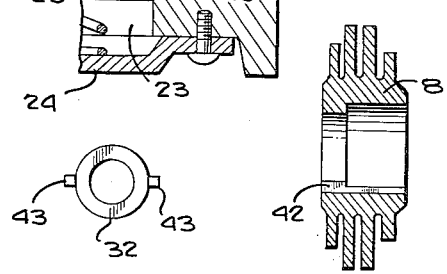
INVENTOR
LUIGI BONO
BY Stevens, Davis, Miller & Mosher
ATTORNEYS

# United States Patent Office 3,054,368
Patented Sept. 18, 1962

3,054,368
DRIVE CONNECTION BETWEEN A DRIVE SHAFT AND AN INTERCHANGEABLE DRIVEN MEMBER, ESPECIALLY FOR THE DRIVE SHAFT AND DRIVEN MEMBER OF A SEWING MACHINE
Luigi Bono, Pavia, Italy, assignor to Necchi Societa per Azioni, Pavia, Italy
Filed Mar. 7, 1960, Ser. No. 13,285
Claims priority, application Italy Oct. 23, 1959
14 Claims. (Cl. 112—220)

The present invention relates in general to new and useful improvements in the sewing machine art, and more particularly relates to a novel connection between a drive shaft and a cam member which is of a nature to permit the readily interchangeability of the cam member.

One type of sewing machine utilizes a cam for effecting the automatic operation thereof in a predetermined pattern. In order to vary the sewing pattern, it is necessary that the cam be readily changeable. However, the space within the housing of a sewing machine is limited with the result that only a very limited amount of space axially of a drive shaft to which the cam is connected, is available. Accordingly, it is a requirement of this invention to provide a connection between a drive shaft and a cam that requires a minimum of space axially of the drive shaft to effect the release and interconnection of the cam with respect to the drive shaft.

Another object of the invention is to provide a novel connection between a drive shaft and a cam wherein the cam is rotatably supported at the end of a drive shaft with the support for the cam being swingable from a position axially aligned with the drive shaft to permit the removal of the cam from the cam support, and a releasable drive connection between the cam and the drive shaft.

Still another object of the invention is to provide a mounting for a driven member, such as a cam, for effecting the ready connection and removal thereof with respect to a drive shaft, the connection including a support bushing for the driven member which is movable from a position axially aligned with the drive shaft in a direction normal to the axis of the drive shaft, the support bushing having an aligning pin movable axially of the drive shaft and being normally seated in a bore in the end of the drive shaft to lock the support bushing in alignment with the drive shaft, the support bushing carrying a drive connector interlockable with both the drive shaft and the driven member to drivingly connect together the two, and the aligning pin and the drive connector being connected together for movement in unison to simultaneously release the support bushing and the drive connector from the drive shaft.

A further object of the invention is to provide a novel mounting for a support bushing, the mounting including a support for the support bushing which is swingable from a position axially aligned with a drive shaft in a plane generally transversely of the axis of the drive shaft and about a pivot pin which has the ends thereof eccentrically mounted to effect the shifting of the support to provide for the desired alignment of the support bushing.

A still further object of the invention is to provide a novel mounting for a cam unit of a sewing machine, which cam unit is engaged by feelers for controlling the operation of the sewing machine, wherein the cam unit may be interchanged relative to an associated drive shaft without effecting the longitudinal movement of the cam unit to permit interchanging of cam units without effecting the feelers.

The foregoing objects, together with other objects which will become apparent, find basis in the detailed description and the accompanying drawings.

In the drawings:

FIGURE 3 is an enlarged fragmentary horizontal sectional view taken along the line III—III of FIGURE 1 and shows further the details of the mounting of the cam unit.

FIGURE 4 is an enlarged fragmentary vertical sectional view taken through the rear portion of FIGURE 3 and shows the details of the mounting of a support and a cam unit release lever carried by the support.

FIGURE 5 is an enlarged fragmentary vertical sectional view through the cam unit and the mounting therefor in relation to the drive shaft for the cam unit.

FIGURE 6 is an enlarged fragmentary vertical sectional view of the cam unit mounting means of FIGURE 5 on a larger scale and shows the specific details thereof.

FIGURE 7 is an enlarged plan view of the cam unit.

FIGURE 8 is an enlarged sectional view of the cam unit taken along the section line VIII—VIII of FIGURE 7.

FIGURE 9 is a plan view of the drive connector between the cam unit and the drive shaft.

Figure 1:
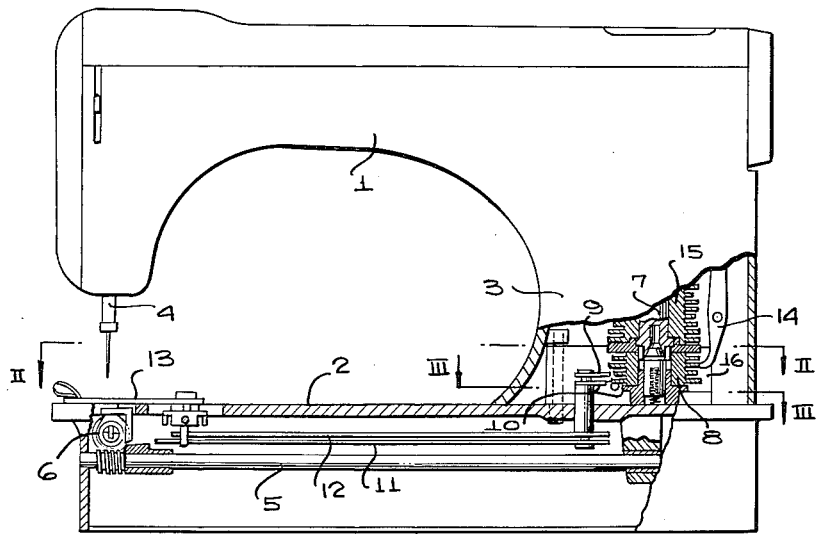
FIGURE 1 is a front elevational view of a sewing machine embodying the invention with portions of the sewing machine being broken away to show the details of the invention.
Figure 2:
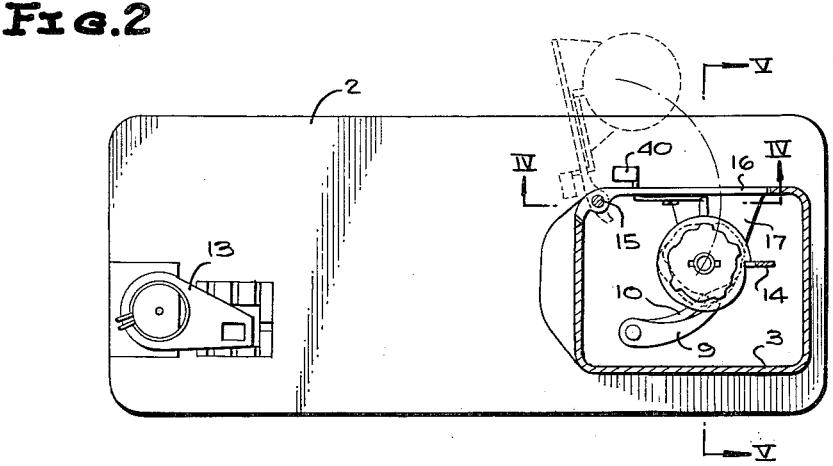
FIGURE 2 is a horizontal sectional view of the sewing machine of FIGURE 1 taken along the section line II—II of FIGURE 1 and shows the details of the mounting of the cam unit, the cam unit being shown in a swung out of the way position by dotted lines.

An example embodiment of the sewing machine to which the present invention relates is illustrated in FIGURES 1 and 2. The sewing machine is of a conventional type and includes an arm 1 and a base 2 which are connected together by a hollow upright 3.

A needle bar 4 is mounted in the arm 1 for the customary reciprocating motion and is driven in the usual manner by a main shaft (not shown) which is rotatably journalled in the arm 1.

A lower shaft 5 is rotatably journalled below the base 2 and is driven together with the main shaft there being the usual connecting means between the main shaft and the shaft 5 which are not shown. A member 6 is supported by the base 2 and forms the desired stitch in synchronism with the reciprocating movements of the needle bar 4. The member 6 is driven from the shaft 5 in the usual manner.

A vertical shaft 7 is mounted for rotation in the upright 3 and is driven from the main shaft. A group of interchangeable cams 8 are applied to the lower portion of the vertical shaft 7. Feelers 9 and 10, for example, are in contact with two of the cams 8 and control a system of levers represented schematically in FIGURE 1 by levers 11 and 12, arranged below the base 2 and adapted to displace a loom 13 which is mounted on the base 2 generally in alignment with the needle bar 4, for example, along the lines of that shown in Patent 268,804, issued December 12, 1882.

The other cams 8 may drive other levers for the operation of other components of the sewing machine. For example, a lever 14, FIGURE 2, acts on one of the cams and drives a device, not shown, for stopping the operation of the sewing machine after one revolution of the cams 8, that is after the loom 13 has made an entire embroidered design in a continuous cycle.

The cams 8 may include a cam which acts in a customary manner on devices for the automatic lateral shifting of the needle bar 4. The feeler which acts on this last mentioned cam is not shown in the drawings, but may be a feeler that may move in a known manner, not to be described herein, along a battery of cams 15 rigidly secured to the vertical shaft 7.

The present invention particularly relates to the mounting of the cams 8 for readily interchanging and the connection thereof to the shaft 7. The means for accomplishing this includes a cover 16 pivoted to the upright 3. The cover 16 carries a bracket 17 which, in turn, carries a cam-holder bushing 18. The pivoting of the cover 16 towards the inside of the upright 3 brings the cam-holder bushing 18 into alignment with the axis of the vertical shaft 7.

The hinge for the cover 16 includes a pivot pin 19 disposed parallel to the axis of the vertical shaft 7. The two ends of the pin 19, which are referred to by the numerals 20 and 21, are respectively positioned in the upright 3 and the base 2 and are eccentric with respect to the central part of the pin 19 which passes through the cover 16. This eccentricity makes it possible to adjust the position of the cover 16 in such a manner that the axis of the cam-holder bushing 18 can be brought precisely in alignment with the axis of the shaft 7 at the lower end thereof. A screw driver slot 22 is provided in the end 21 of the pin 19 to facilitate the adjustment of the pin 19 to position the cam-holder bushing 18. A retaining screw 19′ is carried by the cover 16 and engages the pin 19 to lock the pin 19 in its adjusted position.

The cam-holder bushing 18 has a cylindrical outer surface and an axial bore 23 extends therethrough. The bottom of the cam-holder bushing 18 is closed by a cup 24 suitably secured to the cam-holder bushing 18. A pin 25 is seated in the bore 23 for axial movement therein and is urged upwardly by a spring 26 disposed in the lower portion of the bore 23 and bearing on the cup 24. The pin 25 terminates at its top in a conical frustum 27 and has two grooves 28 and 29 arranged immediately below the frustum 27 and at the lower end of the pin 25, respectively.

An axial bore is formed in the lower end of the vertical shaft 7 with the extreme lower part 30 of the bore being frusto-conical and complementary to the frustum 27. Thus when the cover 16 is moved to a closed position and the pin 25 enters into the vertical shaft 7, the perfect centering of the cam-holder bushing 18 with the shaft 7 is assured.

A ring 31 is seated in the groove 28 of the pin 25 and projects outwardly from the pin. A second ring 32 surrounds the upper part of the pin 25 and abuts the underside of the ring 31 with the ring 31 functioning as a stop. The ring 32 is part of a drive connector, as will be described in more detail hereinafter, and is urged upwardly by a spring 33 which has a lower portion thereof seated in a circumferential groove 34 opening through the top of the cam-holder bushing 18.

As is best illustrated in FIGURES 3 and 5, a lever 35 is pivotally mounted on the bracket 17 of the cover 16 by a pin 37. One end of the lever 35 passes through a slot 36 in the cam-holder bushing 18 and is seated in the groove 29. A second lever 38 is disposed generally at right angles to the lever 35 and is pivotally mounted on the cover 16 by means of a pivot pin 39. One end of the lever 38 underlies the other end of the lever 35 for lifting the same. The other end of the lever 38 is offset and terminates in a control handle disposed on the outer side of the cover 16, the offset portion of the lever 38 extending through a slot 41 in the cover 16.

The group of cams 8, which may be considered to be a cam unit, is of a tubular construction and is journalled on the cam-holder bushing 18. The cams 8 are provided with two axially extending internal keyways 42 which open through the upper end thereof. The ring 32 has a pair of axially extending keys 43 secured to the outer surface thereof with the keys 43 projecting above the ring 32. The lower portions of the keys 43 are received within the keyways 42 and the upper portions of the keys 43 are seated in diametral recesses 44 formed in the lower end of the vertical shaft 7 (FIGURE 6) to drivingly connect together the vertical shaft 7 and the cams 8.

Although only one coupling key 43 is required to drive the cams 8, a single key would result in the production of unbalanced, alternating forces on the cam-holder bushing 18, which would tend to cause the cover 16 to swing about the pivot pin 19 with a resultant misalignment of the cam-holder bushing relative to the vertical shaft 7. This could, of course, result in harmful effects on the precision of the sewing operation. However, when two diametrically opposed keys 43 are provided, a perfect coaxial relationship between the cam-holder bushing 18 and the vertical shaft 7 is maintained.

*Operation*

When it is desired to replace the cams 8, the control handle 40 of the lever 38 is depressed. The lever 38, in turn, pivots the lever 35 and acts to move the pin 25 downwardly or out of the bore in the lower end of the vertical shaft 7. As the pin 25 moves downwardly, the ring 31 carried by the pin 25 pushes the ring 32 of the drive connector downwardly to disengage the keys 43 from the lower end of the vertical shaft 7. After this has been accomplished, the cover 16 is free to be rotated to the dotted line position of FIGURE 2 with this rotation of the cover 16 being assisted by the feelers 9 and 10 pressing against the cams 8. The cam unit may now be lifted off to the cam-holder bushing 18 and a different cam unit seated thereon.

In order to drivingly connect the new cam unit to the vertical shaft 7 to be driven thereby, the cover 16 is merely swung inwardly with a suitable pressure being exerted thereon. The upright 3 has a lower cam surface or inclined plane 45 (FIGURE 5) surrounding the lower end of the vertical shaft 7. As the cover 16 and the components carried thereby are swung inwardly, the pin 25 rides under the cam surface 45 and is held down until it comes into alignment with the bore in the lower end of the vertical shaft 7, at which time it is spring urged into the bore and seats in the lower frusto-conical part 30. At the same time, the keys 43 are spring urged upwardly into the recesses 44 in the lower end of the vertical shaft 7 to drivingly connect the new cam unit to the vertical shaft 7.

It is to be understood that means other than the lever 38 could be provided for pivoting the lever 35, including the direct extension of the lever 35 through the cover 16. In this event, an upward pressure would be required to effect the releasing of the cover 16.

Although only one embodiment of the invention has been illustrated and described, it is readily apparent that minor modifications may be provided and it is intended to cover these modifications in accordance with the appended claims.

What is claimed as new is:

1. In a drive assembly of the type including a drive shaft and an interchangeable driven member drivingly connected to one end of the drive shaft and wherein the space axially of the drive shaft adjacent the driven member is limited; a combined support and drive connection comprising a bushing, means mounting said bushing in axial alignment with the drive shaft and for swinging movement in a plane normal to the axis of the drive shaft, said bushing supporting the driven member for rotation with the drive shaft, and releasable connecting means carried by said bushing for forming an interlock between the drive shaft and the driven member.

2. The device of claim 1 wherein the drive shaft has an axial bore in the end thereof adjacent said bushing, and said bushing has a centering pin received in the drive shaft bore to lock said bushing in alignment with the drive shaft.

3. The device of claim 1 wherein the drive shaft has an axial bore in the end thereof adjacent said bushing, said bushing has a centering pin received in the drive shaft bore to lock said bushing in alignment with the drive shaft, said centering pin being axially movable within said bushing to permit withdrawal thereof from the drive shaft, and a spring bearing on said centering pin for normally urging said centering pin into contact with the drive shaft.

4. The device of claim 3 wherein there is a connection between said centering pin and said connecting means and the two are simultaneously movable together to release both said bushing and the driven member from the drive shaft.

5. The device of claim 1 wherein said releasable connecting means include a support ring supported by said bushing for movement axially of the drive shaft, and at least one axially extending key on said support ring, the drive shaft having a keyway in the end thereof adjacent said bushing receiving an end of said key, and the driven member having an axial keyway slidably receiving said key.

6. In a drive assembly of the type including a drive shaft and an interchangeable driven member drivingly connected to one end of the drive shaft and wherein the space axially of the drive shaft adjacent the driven member is limited; a combined support and drive connection comprising a bushing, means mounting said bushing in axial alignment with the drive shaft and for swinging movement in a plane normal to the axis of the drive shaft, said bushing supporting the driven member for rotation with the drive shaft, the drive shaft having an axial bore in the end thereof adjacent said bushing, said bushing having a centering pin received in the drive shaft bore to lock said bushing in alignment with the drive shaft, said centering pin being axially movable within said bushing to permit withdrawal thereof from the drive shaft, a spring bearing on said centering pin for normally urging said centering pin into contact with the drive shaft, a support ring supported by said bushing for movement axially of the drive shaft, and at least one axially extending key on said supporting ring, the drive shaft having a keyway in the end thereof adjacent said bushing receiving an end of said key, and the driven member having an axial keyway slidably receiving said key.

7. The device of claim 6 wherein said supporting ring is rotatably journalled in said centering pin.

8. The device of claim 6 wherein there is a connection between said centering pin and support ring whereby the two may be withdrawn simultaneously.

9. The device of claim 6 together with a lever assembly engaged with said centering pin for withdrawing said centering pin, said support ring and said key.

10. The device of claim 6 wherein said centering pin and the drive shaft have complementary abutting tapered surfaces assuring the alignment of said bushing with the drive shaft.

11. The device of claim 1 wherein said bushing mounting means is in the form of a support mounted for swinging movement on a pivot disposed parallel to the axis of the drive shaft.

12. The device of claim 1 wherein said bushing mounting means is in the form of a support mounted for swinging movement on a pivot disposed parallel to the axis of the drive shaft, and said pivot has eccentric mounts to permit shifting of said support to facilitate alignment of said bushing with the drive shaft.

13. The device of claim 1 wherein the drive shaft and the driven member are drive components of a sewing machine and the driven member is in the form of a control cam unit.

14. The device of claim 6 wherein the drive shaft and the driven member are drive components of a sewing machine and the driven member is in the form of a control cam unit.

References Cited in the file of this patent

UNITED STATES PATENTS 2,860,589    Sixt _____ Nov. 18, 1958

FOREIGN PATENTS 519,864    Belgium _____ May 30, 1953